United States Patent [19]

Grosjean

[11] Patent Number: 4,977,032

[45] Date of Patent: Dec. 11, 1990

[54] COMPOSITE PVDC-COATED POLYESTER FILMS

[75] Inventor: Pierre Grosjean, Sainte Foy Les Lyon, France

[73] Assignee: Rhone-Poulenc Films, Courbevoie, France

[21] Appl. No.: 382,317

[22] Filed: Jul. 20, 1989

Related U.S. Application Data

[62] Division of Ser. No. 146,735, Jan. 21, 1988, Pat. No. 4,868,064.

[30] Foreign Application Priority Data

Jan. 21, 1987 [FR] France ................................. 87 00823

[51] Int. Cl.$^5$ ....................... B32B 27/08; B32B 27/36; B05D 1/36; B05D 7/26
[52] U.S. Cl. .................................... 428/483; 156/229; 156/244.11; 156/244.24; 427/412.5
[58] Field of Search ............... 428/480, 483, 515, 336, 428/343; 156/244.24, 244.11, 229; 427/412.5

[56] References Cited

U.S. PATENT DOCUMENTS

| 4,289,831 | 9/1981 | Last | 428/515 |
|---|---|---|---|
| 4,745,019 | 5/1988 | Posey et al. | 428/483 X |
| 4,804,566 | 2/1989 | Paul et al. | 428/480 X |

*Primary Examiner*—Thomas J. Herbert
*Attorney, Agent, or Firm*—Burns, Doane, Swecker & Mathis

[57] ABSTRACT

Composite, typically coextruded polyvinylidene chloride (PVDC)-coated polyester films, well adapted, e.g., as packaging materials, include a sulfonated copolyester interlayer which serves as a primer for improvedly adhering the PVDC topcoat to the polyester base.

2 Claims, No Drawings

COMPOSITE PVDC-COATED POLYESTER FILMS

This application is a divisional of application Ser. No. 146,735, filed Jan. 21, 1988, U.S. Pat. No. 4,868,064.

Co-pending applications, Ser. No. 105,019, filed Oct. 6, 1987, now U.S. Pat. No. 4,868,051; Ser. No. 137,067, filed Dec. 23, 1987, now U.S. Pat. No. 4,883,706; and Ser. No. 137,160, also filed Dec. 23,1987, are each assigned to the assignee hereof.

BACKGROUND OF THE INVENTION

Field of the Invention:

The present invention relates to the preparation of polyvinylidene chloride (PVDC)-coated polyester films, the adhesiveness of which is improved by an adhesion primer layer, and the PVDC-coated oriented composite polyester films thus produced.

Description of the Prior Art

Oriented polyester films are a substrate of choice in the packaging field because of their desirable mechanical properties and their transparency. However, it is known to the art that, because of their chemical inertness, their crystallinity or their relative permeability to gases and water vapor, it has proved essential to provide these materials with a coating which is capable of obviating all or some of these defects and, at the same time, imparting new properties thereto. Thus, the application of a polyvinylidene chloride coating on at least one face surface of oriented polyester films to provide packaging films having, on the one hand, excellent properties of impermeability to gases (especially to carbon dioxide and to oxygen) and to water vapor and, on the other hand, an excellent suitability for sealing by heat (heat-sealability) has been proposed to this art. To this end, aqueous dispersions or emulsions of polyvinylidene chloride or of copolymers of vinylidene chloride with a small quantity of one or more unsaturated monomers are employed. These dispersions are applied by the usual coating processes (for example by immersion, spraying or roller coating) onto the polyester film, after orientation by drawing (post-coating). Compare French Pat. Nos. 1,255,353 and 1,478,603. However, the coatings thus obtained have the disadvantage of not adhering very well to the polyester support film. In order to improve the bonding between the polyester film and the PVDC coating, it has been proposed to first apply an anchor layer or adhesion primer layer to the surface of the film destined to receive the coating. Various polymeric materials have been proposed in order to achieve this objective. Organic solutions of polyurethanes have to date proven to be most advantageous with regard to improving the adhesiveness of PVDC to polyesters. However, the use of organic solvents presents many disadvantages from industrial (for example from the point of view of hygiene and safety) and economic (investments necessitated by the recovery of solvents) standpoints. Therefore, the film industry is attempting to avoid use of adhesion primers of this type. For example, improving the adhesiveness of PVDC to polyester films using aqueous emulsions of mixtures of PVDC and a water-dispersible copolyester having a plurality of hydroxysulfonyl-(—SO$_3$H)— group-containing recurring units containing hydroxysulfonyl moieties or the alkali or alkaline earth metal salts thereof (hereinafter referred to as "oxysulfonyl groups") has been proposed in Japanese Patent Application published under No. 58/147,354. While providing beneficial results, this solution is not free from disadvantages. Firstly, it entails the use of copolyesters having a high content of oxysulfonyl group-containing recurring units in order to ensure the water-dispersibility of the copolyesters. Moreover, the PVDC-coating layer thus obtained is rendered more sensitive to moisture because of the presence of a hydrophilic copolyester in the surface coating. Serious need thus remains in the film industry for means which permit the adhesiveness of PVDC to polyester films to be improved, but without adversely affecting the homogeneity of the coating and without requiring the use of organic solutions of adhesion primers.

SUMMARY OF THE INVENTION

Accordingly, a major object of the present invention is the provision of oriented composite polyester films having a PVDC coating improvedly adhered to the polyester supports.

Briefly, the present invention features the production of oriented composite polyester films which comprise a crystalline or semicrystalline polyester support film (A) bearing, on at least one of the face surfaces thereof, a contiguous layer of an adhesion primer coating (B) and a layer of a PVDC coating (C) deposited onto said layer (B).

DETAILED DESCRIPTION OF THE PREFERRED EMBODIMENTS OF THE INVENTION

More particularly according to the present invention, for the production of the subject composite films a crystallizable polyester (a) and a polymeric material based on a copolyester containing a plurality of oxysulfonyl group-containing recurring units are coextruded in the form of a composite film containing a layer (A) of amorphous polyester and at least one layer (B). Such film is next cooled, drawn in at least one direction, the drawn film is thermoset and is then coated with an aqueous latex of PVDC. The coating thus obtained is finally dried, and the PVDC is then crystallized.

Consistent herewith, it has been observed that the application, prior to coating with the PVDC latex, of an adhesion primer layer based on a copolyester containing oxysulfonyl group-containing recurring units (hereinafter referred to as "sulfonated copolyesters" for reasons of convenience) results in an improvement in the adhesiveness of the PVDC coating without any deleterious effects on the homogeneity of the film. Moreover, this invention offers many advantages from the point of view of industrial production. Indeed, it eliminates the need for carrying out a two-stage coating process (on an oriented polyester film):

(i) with an adhesion primer composition (generally as an organic solution); and (ii) with the aqueous PVDC latex, which entails sequential drying of the respective coatings.

Additionally, the process of the invention can be perfectly integrated with industrial means for the manufacture of films, because the coextruded film may be employed for purposes other than for the production of a PVDC-coated composite. The use of a sulfonated copolyester-based adhesion primer enables a corona treatment of the polyester support prior to applying the primer to be omitted. Finally, the subject process enables production of films having both excellent barrier properties and an excellent adhesiveness of the PVDC coating.

By the term "crystallizable polyester" are intended polyesters or copolyesters which, after extrusion in the molten state through a die followed by the drawing of the amorphous polymer, result in crystalline or semicrystalline polyesters or copolyesters. The crystallinity of the polymers is determined by conventional means which are well known to this art, such as X-ray diffraction, differential thermal analysis [cf. S. H. Lin et al, *J. Polymer Sci., Polymer Symposium,* 71 121–135 (1984)]and density test.

The crystallizable polyesters employed for the preparation of the support layer (A) are those polyesters and copolyesters which are commonly used for the production of oriented polyester films by drawing and having, after drawing, a crystalline or semicrystalline structure.

For this purpose, it is possible to employ any film-forming polyester obtained from one or more carboxylic diacid(s) or their lower alkyl esters (terephthalic acid, isophthalic acid, 2,5-naphthalenedicarboxylic acid, 2,6naphthalenedicarboxylic acid, 2,7-naphthalenedicarboxylic acid, succinic acid, sebacic acid, adipic acid, azelaic acid, diphenyldicarboxylic acid and hexahydroterephthalic acid) and one or more diols or polyhydric alcohols such as ethylene glycol, 1,3-propanediol, 1,4-butanediol, neopentyl glycol and 1,4-cyclohexanedimethanol, polyoxyalkylene glycols (polyoxyethylene glycol, polyoxypropylene glycol or their random or block copolymers). When copolymers are employed, they must have a sufficient content of monomeric component(s) responsible for imparting crystallinity. Homopolyesters and copolyesters derived from terephthalic acid are preferably employed. In the case of copolyesters, the latter preferably have a terephthalate unit content representing at least 80 mol % of the diacid units and more preferably at least 90%. The polyesters and copolyesters derived from ethylene glycol and from 1,4-butanediol constitute a preferred class of polymers used for the production of layer (A). Advantageously, the polyester is an ethylene glycol polyterephthalate having an intrinsic viscosity, as determined at 25° C. in o-chlorophenol, of from 0.6 to 0.75 dl/g.

The sulfonated copolyester-based polymeric material employed for the production of the adhesion primer layer (B) may be either a single sulfonated copolyester or a mixture of such copolyester with one or more non-sulfonated polyesters or copolyesters as described below.

Exemplary oxysulfonyl group-containing copolyesters useful for the production of layer (B), those copolyesters having a plurality of groups of the following general formula are representative:

in which n is 1 or 2, and M is a hydrogen atom, an alkali metal (for example sodium or potassium), an alkaline earth metal (calcium or barium), an ammonium cation or a quaternary ammonium cation.

Oxysulfonyl group-containing copolyesters are known polymers. Such copolyesters are described in the above French Pat. Nos. 1,401,581 and 1,602,002. These copolyesters may be prepared by the polycondensation of one or more aromatic dicarboxylic acids with one or more aliphatic diols and at least one bifunctional comonomer containing at least one oxysulfonyl group. The oxysulfonyl group-containing bifunctional comonomers may be carboxylic diacids or diols, such as those noted in French Pat. No. 1,602,002 or U.S. Pat. No. 3,779,993. The oxysulfonyl groups are preferably linked to an aromatic radical.

Exemplary of the oxysulfonyl group-containing bifunctional comonomers, the aromatic acids of the following general formula are particularly representative:

in which M and n are as defined above; Z is a polyvalent aromatic radical; X and Y are hydroxycarbonyl radicals or derivatives thereof: lower aliphatic alcohol esters or acid halides (chloride or bromide); and p is an integer equal to 1 or 2.

In formula (II), Z is preferably a phenyl radical or a combination of two or more than two ortho- or peri-fused phenyl radicals, or of two or more phenyl groups linked to one another via inert bridging groups such as alkylene (for example methylene, ethylene or propylene) or alkylidene (propylidene) radicals, or ether, ketone or sulfone groups.

As specific examples of oxysulfonyl group-containing dicarboxylic acids, representative are hydroxysulfonylterephthalic acids; hydroxysulfonylisophthalic acids (especially 5-sulfoisophthalic acid); hydroxysulfonylorthophthalic acids; 4-hydroxysulfonyl-2,7-naphthalenedicarboxylic acid; hydroxysulfonyl-4,4'-biphenyldicarboxylic acid; hydroxysulfonyl-4,4'-(dihydroxycarbonyl)diphenyl sulfones; hydroxysulfonyl-4,4'-(dihydroxycarbonyl)diphenylmethanes; 5-(hydroxysulfonylphenoxy)isophthalic acid and 5-(hydroxysulfonylpropoxy)isophthalic acid. The sulfonated copolyesters derived from hydroxysulfonylisophthalic acids are very particularly well suited for the preparation of the composite films according to the invention.

The non-sulfonated dicarboxylic acids which may be combined with the terephthalic acid in order to prepare the oxysulfonyl group-containing copolyesters are those which are typically used for the production of polyesters. Exemplary are terephthalic, isophthalic, phthalic, 2,5-naphthalenedicarboxylic and 2,6-naphthalenedicarboxylic acids; 4,4'-(dihydroxycarbonyl)-diphenyl sulfone; 4,4'-(dihydroxycarbonyl)-diphenyl ether; and alkanedioic acids containing from 4 to 16 carbon atoms such as adipic, succinic and sebacic acids. These acids may be employed alone or in admixture with one another. Isophthalic acid is preferably used.

When the oxysulfonyl group-containing copolyesters contain in their structure units derived from alkanedicarboxylic acids, these units represent from 5 to 30 mole % of the total amount of the non-sulfonated dicarboxylic acids. In this case, isophthalate units may also be present; however, it is preferable that the content thereof does not exceed 10 mole % of the total amount of the non-sulfonated dicarboxylic acids.

The oxysulfonyl group-containing copolyesters which are very particularly well suited for carrying out the present invention are those which contain a number of terephthalate units representing at least 70% of the total number of the non-sulfonated diacid units, from 5 to 30% of $C_4$–$C_{16}$ aliphatic diacid units, from 0 to 10% of isophthalate units, from 3 to 20% of the total number of recurring units derived from carboxylic acids, sulfonic group-containing dicarboxylic acids and at most 10% by weight of diethylene glycol or its higher oligomers as defined above, relative to the copolymer.

Exemplary diols which may be employed for the preparation of the oxysulfonyl group-containing copolyesters, representative are ethylene glycol, propylene glycol, 1,3-butanediol, 1,4-butanediol, 2,2-dimethyl-1,3-propanediol, 1,5-pentanediol, 1,6-hexanediol, cyclohexanedimethanol, neopentylglycol, diethylene glycol and tri-, tetra-, penta- and hexaethylene glycol. Ethylene glycol and its oligomers are very particularly well suited. They may be employed alone or in admixture with one another and/or with other diols. Mixtures of ethylene glycol and its oligomers having a molecular weight less than 600 are preferred. In the latter case, the ethylene glycol oligomer content, expressed as a percentage by weight of the sulfonated polyester, is preferably at least equal to 2% and at most equal to 30%. A proportion of from 5 to 25% by weight is even more preferred.

The content of oxysulfonyl group-containing recurring units in the sulfonated copolyesters, expressed relative to the total number of recurring units of the same nature (diacid or diol), ranges from 2 to 20% and preferably from 3 to 10%. Thus, when an oxysulfonyl group-containing dicarboxylic acid is employed, the number of recurring units derived from the latter constitutes from 2 to 20% of the total number of recurring units derived from the different dicarboxylic acids.

Among the oxysulfonyl group-containing copolyesters, those containing in their chain a plurality of terephthalate units, 5-oxysulfonylisophthalate units, optionally isophthalate units and a plurality of units derived from ethylene glycol and/or its oligomers are the preferred. Copolyesters in which the number of 5-oxysulfonylisophthalate recurring units represent from 2 to 20% of the total number of units derived from dicarboxylic acids are advantageously used. When the copolyesters contain both terephthalate and isophthalate units, the latter preferably constitute at most 70% of the total number of terephthalate/isophthalate units. A number of isophthalate units ranging from 5 to 60% of this total is well suited.

The sulfonated copolyesters described above may be prepared by conventional known processes. Thus, it is possible to react, in a first stage, the diol or the diols with a methyl ester of the carboxylic acid or acids, one or the other group of reagents containing the oxysulfonyl group-containing bifunctional comonomer in order to form, by transesterification, in the presence of the usual catalysts, the corresponding diol esters and then, in a second stage, to conduct a polycondensation in known manner. According to another method, it is possible to prepare two prepolycondensates, one of which contains the oxysulfonyl group-containing recurring units and to react them in the presence of common catalysts until a copolyester of a higher molecular weight is produced. The oxysulfonyl group-containing copolyester may be a block copolyester or a random copolyester.

In the preparation of the composite films according to the invention, it may prove advantageous to employ a mixture of a sulfonated copolyester such as those described above with one or more non-sulfonated polyesters or copolyesters. The use of such mixtures may enable the adhesive properties of the primer layer to be varied. Moreover, the combination of one or more non-sulfonated polyesters or copolyesters may prove to be advantageous, or even essential, when sulfonated copolyesters are employed which, because of their composition (relatively high content of sulfonated recurring units and/or possible presence of recurring units derived from other compounds), have rheological properties and bonding temperatures which are not well suited to coextrusion.

Many non-sulfonated film-forming polyesters or copolyesters may be combined with the sulfonated copolyesters to form the primer layer (B) by the process of the invention. A first class of non-sulfonated polymers consists of crystallizable polyesters and copolyesters such as those described for the production of the support film (A). Polyterephthalates of diols and especially ethylene glycol polyterephthalate, as well as copolyesters containing at least 80 mol % of ethylene glycol terephthalate units are very particularly well suited. In this case, the crystallizable polyester may be identical to or different from that forming the support (A).

Non-crystallizable polyesters or copolyesters form another class of polymers which may be combined with the sulfonated copolyesters. These polyesters are characterized by the presence in their chain of a sufficient quantity of recurring units which impart an amorphous nature thereto, such as, for example, phthalate an isophthalate units, units derived from alkanedioic acids containing at least 4 carbon atoms (adipate or succinate), units derived from branched aliphatic diols containing at least 4 carbon atoms (neopentylglycol) and from alicyclic diols (cyclohexanedimethanol). For this purpose, it is possible to employ amorphous copolyesters having a plurality of units such as those mentioned above and a quantity of ethylene glycol terephthalate units which is insufficient to render them crystallizable. Exemplary are amorphous copolyesters derived from terephthalic acid, ethylene glycol and cyclohexanedimethanol, or amorphous copolyesters derived from terephthalic acid, isophthalic acid, ethylene glycol and neopentyl glycol.

It is also within the ambit of the present invention to combine two or more than two non-sulfonated polyesters with the sulfonated copolyester. Thus, it is envisaged to use a ternary mixture comprising a crystallizable polyester (a), a sulfonated copolyester (b) and a non-crystallizable amorphous polyester (c).

When a mixture of a sulfonated copolyester and a crystallizable polyester and/or a non-crystallizable amorphous polyester is employed, the sulfonated copolyester content of the mixture depends, to a large extent, on the characteristics of the sulfonated copolyester (content of oxysulfonyl group-containing recurring units; rheological properties and bonding temperature). It is generally selected such as to provide both a good adhesion of the primer to the support and rheological properties and/or a bonding temperature which permit a composite film to be readily produced by coextrusion. The proportion of non-sulfonated polyester added to the sulfonated copolyester is preferably selected such that the content of oxysulfonyl group-containing recurring units in the resulting mixture, expressed relative to the total number of recurring units of the same nature, preferably ranges from approximately 2% to approximately 10% such as to provide this mixture with good adhesive properties. Where appropriate, the non-sulfonated polyester content could additionally be selected such as to provide the resulting mixture with a bonding temperature higher than 100° C. and/or rheological properties which are as close as possible to that of the polyester which constitutes the support layer (A). In general, when a crystallizable polyester (a) or a non-crystallizable amorphous polyester (c) is employed, the proportion of (a) or of (c) in the mixture with the sulfonated copolyester (b) preferably ranges from 20 to 80% by weight of the total and more preferably from 40 to 60% by weight of the mixture. In the case of a ternary mixture which contains crystallizable polyesters (a), sulfonated copolyesters (b) and non-crystallizable amorphous polyesters (c) at the same time, the proportions by weight of (a), (b) and (c) in the mixture are advantageously within the following ranges:

(a): from 30 to 65% of the mixture;
(b): from 15 to 60% of the mixture; and
(c): from 10 to 55% of the mixture;

and more preferably within the following ranges:

(a): from 35 to 60% of the mixture;
(b): from 20 to 55% of the mixture; and
(c): from 10 to 50% of the mixture.

Additionally, the use of mixtures of sulfonated copolyesters and non-sulfonated polyesters is particularly advantageous when it is desired to impart a certain roughness to layer (B) using fillers. In this case, it is sufficient to employ a polyester (a) and/or (c) containing a suitably selected proportion of filler. Thus, increasing the range of sulfonated copolyesters to be made available to the film producer may be avoided.

For the production of layer (B), it is also envisaged to use mixtures of at least two sulfonated copolyesters which differ from one another by the nature of their recurring units and/or their content of oxysulfonyl group-containing recurring units. Similarly, in the case where mixtures of (b) and of polyesters (a) and/or (c) are employed, it would be possible to use mixtures of two or more than two polyesters (a) or of two or more than two polyesters (c).

Layers (A) and/or (B) may contain fine particles to modify the surface roughness of the layer containing them, by imparting good slip properties thereto.

The fillers present may be fine particles introduced into the polymeric composition and/or particles originating from catalytic residues or from precipitation adjuvants. The roughness is preferably imparted by introducing fine inert particles into the polymeric composition.

The quantity of particles present is such that the particle content of the entire layer is from 0.05 to 1% and preferably from 0.02 to 0.5% by weight. With regard to the volume-median diameter of these particles, this typically ranges from 0.1 to 5 microns and preferably from 0.2 to 3 microns.

The nature of inert particles added may be very diverse: these may be inorganic particles (oxides or salts of elements of Groups II, III and IV of the Periodic Table), or alternatively polymeric particles. Among such fillers, representative are silica, silicoaluminates, calcium carbonate, MgO, $Al_2O_3$, $BaSO_4$ and $TiO_2$. A mixture of several fillers may obviously be employed.

When layer (B) is a mixture of polyesters (b) and (a) and/or (c) and contains particles in the finely divided state, the latter may be introduced via any or several of the polyesters constituting the mixture. However, it is preferable in practice (and this is an added advantage of the present invention) that the fillers be introduced via the non-sulfonated polyester. Indeed, it is sufficient to vary the quantity of component (a) and/or (c) charged in the mixture and/or the filler content of (a) and/or (c) in order to obtain layers (B) having varied topographies, without having to charge a wide range of components (b).

In one embodiment of the present invention, the layers (A) and/or (B) may additionally contain various additives which are commonly employed in the film industry, such as, for example, heat stabilizers which enable the film to be recycled.

According to the present invention, the layer(s) (B) is applied onto the support layer (A) by coextrusion. For this purpose, a crystallizable polyester providing an amorphous film which becomes crystalline or semicrystalline after being subjected to a drawing treatment followed by a thermosetting treatment is charged into a first die, whereas the sulfonated copolyester or, where appropriate, a mixture of the sulfonated copolyester and a non-sulfonated polyester, is extruded simultaneously via at least one second die arranged parallel to the first and in the immediate vicinity thereof. The latter mixture may be prepared by any known mixing and homogenizing technique in a single stage or in several stages. It may be prepared directly, just before being extruded, by melting its components at high temperature, or may have been prepared beforehand, extruded and packaged in the form of granules and remelted, optionally after diluting with crystalline, semicrystalline or crystallizable polyester granules. The conditions for preparing and for extruding the binary mixture are selected such as not to cause a change in this mixture towards the formation of block polymers, or even random polymers, such that the specific properties of each constituent of the mixture would be profoundly modified or would disappear (for example crystallinity). In particular, the residence time of the mixture in the extruder which provides for the mixing of the components and the extrusion is maintained sufficiently short such as to avoid a profound modification of the polymers.

The conditions for drawing the extruded composite film are those which are commonly employed in the production of polyester films. Thus, it is possible to conduct a monoaxial drawing or a biaxial drawing carried out in sequence or simultaneously in two directions, generally orthogonal, or alternatively sequences of at least 3 drawings in which the drawing direction is changed in each sequence. Moreover, each unidirectional drawing itself may be carried out in several stages. It will be possible to combine drawing sequences such as, for example, two successive biaxial drawing treatments, it being possible for each drawing to be carried out in several stages.

The composite film is preferably subjected to a biaxial drawing in two perpendicular directions. For example, it is possible to first carry out a drawing in the direction of movement of the film (longitudinal drawing) and then a drawing along a perpendicular direction (transverse direction) or vice versa. In general, the longitudinal drawing is carried out to an extent of from 3 to 5 (i.e., the length of film drawn represents from 3 to 5 times the length of the amorphous film) and at a temperature from 80° to 100° C. and a transverse drawing is carried out to an extent of from 3 to 5 at a temperature from 90° to 120° C.

The drawing may also be carried out simultaneously, i.e., simultaneously in the longitudinal direction and in the transverse direction, for example to an extent of from 3 to 5 and at a temperature of from 80° to 100° C.

Depending on the choice of drawing conditions, it is possible to produce specific surface topographies such as the presence of cavities surrounding a protuberance.

This possibility of producing specific topographies additionally depends on the choice of the polymer and its adjuvants.

The composite film resulting from coextrusion and intended to be coated with an aqueous PVDC latex is a thin film having a thickness less than 50 micrometers and preferably from 5 to 40 micrometers. It may contain a single layer (B) or two layers (B) (a layer B on each face surface of the support layer A). In this case, the layers (B) may be identical or different. The layers (B) may then differ from each other by the nature of the sulfonated polyesters and/or the presence or absence of fillers, and/or by the filler content and/or alternatively by their thickness. When the coextruded composite support film contains only a single layer (B), the other face surface of layer (A) may contain a layer (D) other than layers (A) and (B). The layer (D) may differ from layer (A) by the nature of the polyester comprising same and/or by the presence of fillers in one or the other layer and/or by the nature and/or the particle size and/or the content of these fillers. A convenient means for modifying the surface properties (topography) of the face surface of the extruded composite film opposite to that which carries layer (B) is then made available. It is then possible to vary the roughness, the coefficient of friction and the scratch resistance thereof according to the final use of the films.

The PVDC coating applied onto the adhesion primer layer(s) (B) of the coextruded composite support film is a film-forming vinylidene chloride polymer or copolymer of the type commonly employed for coating polyester films. Thus, polymers containing at least 80 % of vinylidene chloride recurring units and preferably at least 85% are employed. Copolymers containing from 85 to 95% of vinylidene chloride units and from 15 to 5% of units derived from one or more ethylenic monomers are particularly well suited. Copolymers of vinylidene chloride with monomers having ethylenic unsaturation, such as acrylic monomers like acrylic or methacrylic acids, are preferably employed; alkyl acrylates or methacrylates (methyl or ethyl acrylates and methacrylates) and acrylonitrile are particularly well suited for this purpose.

It is also possible to employ comonomers such as crotonic acid and lower alkyl crotonates (containing from 1 to 4 carbon atoms), maleic, fumaric and itaconic acids and their esters, vinyl esters and especially vinyl acetate. Other examples of ethylenic monomers which may be employed with vinylidene chloride are noted in French Pat. No. 1,255,353.

The aqueous PVDC lattices employed according to the present invention are emulsions or dispersions obtained by the usual processes of emulsion polymerization in an aqueous medium. Such a process is well described in French Pat. No. 1,254,025. The solids content of the latex generally ranges from 10 to 50% by weight. It may contain from 0.01 to 5% by weight, relative to the solids, of an agent intended to improve the slipperiness of the resulting coating. Waxes such as carauba wax, spermaceti wax, palm wax and hydrogenated castor oil or esters of long carbon chain fatty acids such as benzyl stearate and pentaerythritol distearate, may be employed for this purpose. The PVDC lattices may contain other additives which are well known to this art, for example pigments, dyestuffs, fillers and antistatic or stabilizing agents.

The coextruded composite support film is coated with the aqueous latex by well known processes, such as those described, for example, by G. L. Booth in *Modern Plastics*, No. 9, pages 91 et seq, and No. 10, pages 90 et seq (1958).

The thickness of the layer of PVDC coating varies according to the properties desired for this coating and especially according to the extent to which the barrier effect towards gases and water vapor is to be imparted to the coated film. The thickness of the PVDC coating is generally within a range of from approximately 0.05 to approximately 10 micrometers and preferably from approximately 0.1 to approximately 5 micrometers. In order to achieve such thicknesses, a quantity of dry solids of from approximately 0.1 g/m$^2$ to approximately 6 g/m$^2$ is generally applied. When the coextruded support film contains on each face surface an adhesion primer coated layer (B), only one of the layers (B) or both the layers (B) may be coated with the PVDC latex.

The composite polyester films bearing the PVDC coatings are dried under typical temperature conditions in order to effect water removal, the coalescence of the polymer particles in the form of a continuous film and the crystallization of the polymer.

The process according to the invention makes it possible to produce PVDC-coated oriented polyester films having a particularly high adhesion of said coating to the support, and which are well suited for use in the packaging field. Such composite films are an attractive feature of the present invention.

The subject oriented composite polyester films thus comprise a crystalline or semicrystalline polyester support film (A) containing on at least one face surface thereof a contiguous layer of an adhesion primer coating (B) and a layer of PVDC-coating (C) deposited onto said layer (B), and wherein the adhesion primer layer (B) comprises at least one copolyester containing a plurality of oxysulfonyl group-containing recurring units and advantageously is formed by coextrusion.

In order to further illustrate the present invention and the advantages thereof, the following specific examples are given, it being understood that same are intended only as illustrative and in nowise limitative. In said examples to follow, the crystallizable, crystalline or semicrystalline polyesters are referred to as (a), the sulfonated copolyesters as (b), and the non-crystallizable amorphous polyesters as (c). The following polymers were employed:

(1) Crystallizable polyesters (a)

Reference (a1)

This was an ethylene glycol polyterephthalate containing 1.5 mol % of diethylene glycol and having a viscosity index of 740 as determined at 25° C. in orthochlorophenol.

Reference (a2)

This was a polyester (a1) containing 0.35% by weight of kaolinite having an average particle size of 1 micrometer.

(2) Sulfonated polyesters (b)

Reference (b1)

This copolyester was prepared as follows:

According to known technique, a prepolycondensate was first prepared by the reaction between isophthalic acid, 5-sulfoisophthalic acid and ethylene glycol in the presence of sodium acetate which was employed as catalyst; esterification was carried out at atmospheric pressure up to 220° C. followed by prepolymerization up to 240° C.

Another prepolycondensate was also prepared starting with dimethyl terephthalate and ethylene glycol in the presence of manganese acetate. The interchange was carried out at atmospheric pressure up to 225° C. After adding a phosphorus-containing stabilizer and antimony trioxide, this prepolycondensate was mixed with the prepolycondensates described in the preceding paragraph. The mixture was heated to 275° C., the pressure being gradually reduced to 0.5 torr.

The copolyester obtained was then cast and granulated. It had the following characteristics:

(i) isophthalic acid content in the terephthalic acid (TA)/isophthalic acid (IA) mixture in mol %: 60;

(ii) 5-sulfoisophthalic acid (SIA) content in moles per 100 moles of non-sulfonated aromatic diacids (TA/IA): 14%;

(iii) diethylene glycol (DEG) content by weight: 14%

Reference (b2)

This was a copolyester having the following composition:
SIA mol %: 3.5
TA mol %: 85
IA mol %: 15
DEG % by weight: 15

Reference (b3)

A copolyester corresponding to the following composition:
SIA mol %: 3.5
TA mol %: 85
IA mol %: 15
DEG % by weight: 3
cyclohexanedimethanol mol %: 7

Reference (b4)

A copolyester corresponding to the following composition:
SIA mol %: 14
TA mol %: 80
IA mol %: 20
DEG % by weight: 14

Reference (b5)

SIA mol %: 3.5
TA mol %: 95
IA mol %: 5
DEG % by weight: 1.7

(3) Amorphous non-sulfonated polyester (c)

Reference (c1)

A copolyester marketed under the trademark DYNAPOL L 206 by DYNAMIT NOBEL, of the TA/IA/ethylene glycol/neopentylglycol type was employed.

Reference (c2)

This was a copolyester marketed under the trademark KODAR PETG 6763 by KODAK, of the TA-/ethylene glycol/cyclohexanedimethanol type.

(4) PVDC Latex (L)

Reference (L1)

This was a latex of the trademark IXAN PA 204 marketed by SOLVAY, containing 43% by weight of solids and 0.3% by weight relative to the dry extract of a silica filler of the trademark "SYLOID 72".

Reference (L2)

This was the latex L1 diluted such as to lower its solids content to 30% by weight and containing 0.3% of SYLOID 72 per 100 g of dry extract.

A series of coextruded composite support films (F) was produced starting with polyesters (b), (a) and/or (c), operating as follows: a crystallizable polyester (a) and a sulfonated copolyester (b) or a mixture of (b) and (a) or a non-crystallizable amorphous copolyester (c) were coextruded. The main extrusion line for layer (A) operated at 275° C. and the satellite extrusion line for layer (B) at a temperature below 275° C. Before extrusion, the sulfonated copolyesters (b) were oven-dried under moisture-free air, and then stored and charged under an inert gas atmosphere, into the screw-type extruder of the satellite extrusion line.

When a mixture of (b) and (a) was employed, this mixture was prepared as follows: the polyester (a) was dried at 160° C. in order to remove any traces of moisture and the sulfonated copolyester was oven-dried under moisture-free air. The two components of the mixture, which were in a particulate form, were stored and fed in predetermined proportions, under an inert gas atmosphere, into the screw-type extruder of the satellite line.

The following oriented composite polyester films were prepared:

| | Layer A | | | Layer B | | | | | |
|---|---|---|---|---|---|---|---|---|---|
| | | | | Sulfonated copolyester | | Crystallizable polyester | | Amorphous polyester | |
| FILMS | Reference for polyester | Thickness in μm | Thickness in μm | Reference | % by weight (1) | Reference | % by weight (1) | Reference | % by weight (1) |
| F1 | (a1) | 12 | 1 | (b1) | 25 | — | — | (c2) | 75 |
| F2 | (a1) | 12 | 1 | (b1) | 50 | — | — | (c2) | 50 |
| F3 | (a1) | 12 | 1 | (b2) | 100 | — | — | — | — |
| F4 | (a1) | 12 | 1 | (b3) | 100 | — | — | — | — |
| F5 | (a1) | 12 | 1 | (b4) | 25 | (a2) | 75 | — | — |
| F6 | (a1) | 12 | 1 | (b2) | 100 | — | — | — | — |

(1) In the mixture

EXAMPLE 1

The film F1, 900 mm in width, was passed through a pilot-scale coating machine at a speed of 20 m/min in order to apply on one of its face surfaces a layer of the latex L1, at a rate of 4 g of dry extract per m². The coating thus obtained was dried by passing the film through a tunnel drier countercurrently to a hot air flow. The dry coated film F'1 thus obtained was cooled and reeled. The reel was maintained at room temperature and for a period of time sufficient to effect crystallization of the PVDC. When the crystallization was complete, the film F'1 was subjected to a test designed to determine the adhesiveness of the PVDC coating to the polyester support. For this purpose, the force required to cause separation of two 38mm-wide samples of the film F'1 (which were heat-sealed to each other with the PVDC-coated surfaces facing each other, in a heat-sealing machine, by pressing the samples for 1 second at a pressure of 1.4 kg/cm² between the jaws of said machine heated to 140° C.) was determined. The specimens thus obtained were maintained at 23° C. in an atmosphere which had a relative humidity (RH) equal to 50. After 3 days and 7 days under these conditions, a pull was exerted on each sample forming the specimens and the separating force for the weld, expressed in newtons per cm, was determined dynamometrically. The following results were obtained:

| Treatment period | Separating force |
| --- | --- |
| 3 d | 0.8 N/cm |
| 7 d | 1 N/cm |

EXAMPLE 2

A film F'2 was prepared starting with the film F2, following the procedure of Example 1, and the separating force for the heat-sealed specimens obtained as above was determined under the same conditions. The following results were obtained:

| Treatment period | Separating force |
| --- | --- |
| 3 d | 0.8 N/cm |
| 7 d | 0.7 N/cm |

EXAMPLES 3 TO 5

A series of PVDC-coated films F'3, F'4 and F'5 was prepared by passing 900 mm-wide coextruded films F3, F4 and F5 at a speed of 150 m/min through an air-knife coating machine, in which 2 g/m² of solids of the latex L2 were applied.

Specimens of coated films F'3, F'4 and F'5 were then prepared as described in Example 1. The specimens were then maintained for 3 days at 38° C. in an atmosphere with an RH of 90%. The determination of separating force gave the following results:

| Films | Separating force |
| --- | --- |
| F'3 | 0.2 N/cm |
| F'4 | 0.2 N/cm |
| F'5 | 0.5 N/cm |

By way of comparison, two PVDC-coated polyester films FC1 and FC2 were prepared by applying the latex L2 at a rate of 2 g/m² of solids to two polyester films which had been subjected to a corona treatment. The polyester support film for FC1 did not contain any adhesion primer and the support film for FC2 contained a polyurethane coating of the trademark ADCOTE 376. Specimens of films FC1 and FC2 were prepared as described above and treated under the same conditions and the separating force was then determined. The following results were obtained:

| Films | Separating force |
| --- | --- |
| FC1 | 0.2 N/cm |
| FC2 | 0.2 N/cm |

EXAMPLES 6 AND 7

Two PVDC-coated films F"5 and F'6 were prepared by passing films F5 and F6 at a speed of 250 m/min through a coating machine containing a coating roll and a ceramic smoothing bar, in which the latex (L3) was applied at a rate of 2 g/m² to one face surface of films F5 and F6. The coated films were then treated as in Example 1.

Specimens were prepared from films F"5 and F'6, according to the method described in Example 1. These specimens were subjected to a separating force determination without prior treatment. The following results were obtained:

| Films | Separating force |
| --- | --- |
| F"5 | 0.82 N/cm |
| F'6 | 0.48 N/cm |

By way of comparison, a PVDC-coated polyester film (FC3) was prepared by applying the latex L3 at a rate of 0.2 g/m² of solids to a 12 micrometer-thick polyester film (a2) containing an adhesion primer layer based on a polyurethane of the trademark ADCOTE 376 which was applied after a corona treatment of the polyester support film. Operating as above, the separating force was determined for a specimen obtained according to the process already described. The breaking force for the weld amounted to 0.43 N/cm.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A product comprising a crystalline or semicrystalline polyester film substrate (A), said film substrate (A) having a coating (B) comprising an oxysulfonylated copolyester adhesion primer on at least one of the face surfaces thereof, and a polyvinylidene chloride topcoat (C) on said at least one primer coating (B); wherein the product is produced by the process of coextruding the crystallizable polyester film (A) with said coating (B), next orienting and thermosetting such coextrudate, and then coating such coextrudate with an aqueous latex of polyvinylidene chloride so as to obtain the product.

2. A process for the production of a composite film comprising a crystalline or semi-crystalline polyester film substrate (A), said film substrate (A) having a coating (B) of an oxysulfonylated copolyester adhesion primer on at least one of the face surfaces thereof, and a polyvinylidene chloride topcoat (C) on said at least one primer coating (B); said process comprising coextruding a crystallizable polyester film (A) with said coating (B), next orienting and thermosetting such coextrudate, and then coating such coextrudate with an aqueous latex of polyvinylidene chloride.

* * * * *